United States Patent
Hamm et al.

(10) Patent No.: US 9,910,446 B2
(45) Date of Patent: Mar. 6, 2018

(54) MODULAR VALVE SYSTEM

(71) Applicant: Buerkert Werke GmbH, Ingelfingen (DE)

(72) Inventors: Thomas Hamm, Ingelfingen (DE); Michael Tasch, Kupferzell/OT Neu-Kupfer (DE); Jochen Walther, Neuenstein (DE)

(73) Assignee: Buerkert Werke GmbH, Ingelfingen (DE)

( * ) Notice: Subject to any disclaimer, the term of this patent is extended or adjusted under 35 U.S.C. 154(b) by 53 days.

(21) Appl. No.: 14/856,851

(22) Filed: Sep. 17, 2015

(65) Prior Publication Data

US 2016/0091900 A1    Mar. 31, 2016

(30) Foreign Application Priority Data

Sep. 25, 2014   (DE) .................... 20 2014 104 599 U

(51) Int. Cl.
| | |
|---|---|
| *F16K 7/12* | (2006.01) |
| *G05D 7/01* | (2006.01) |
| *F15B 13/08* | (2006.01) |
| *F16K 27/00* | (2006.01) |

(52) U.S. Cl.
CPC ........ *G05D 7/0113* (2013.01); *F15B 13/0825* (2013.01); *F15B 13/0871* (2013.01); *F16K 7/12* (2013.01); *F16K 27/003* (2013.01)

(58) Field of Classification Search
USPC ........................................................ 137/884
See application file for complete search history.

(56) References Cited

U.S. PATENT DOCUMENTS

| | | | |
|---|---|---|---|
| 4,312,425 A | * | 1/1982 | Snow ..................... F16N 25/02 184/7.4 |
| 5,201,899 A | | 4/1993 | Austin, Jr. et al. |
| 5,529,088 A | * | 6/1996 | Asou ................... F15B 13/0825 137/271 |

(Continued)

FOREIGN PATENT DOCUMENTS

| | | |
|---|---|---|
| DE | 4220006 | 1/1993 |
| DE | 102013104688 | 11/2013 |
| WO | 9954632 | 10/1999 |

OTHER PUBLICATIONS

Search Report dated Jun. 17, 2015 by the German Patent and Trademark Office for German Patent Application No. DE 202014104599.6.

*Primary Examiner* — John Fox
(74) *Attorney, Agent, or Firm* — Dilworth IP LLC

(57) ABSTRACT

A modular valve system (10) to be mounted to a support, in particular a support in an electric control cabinet, comprises at least two individual valve modules (12) which can be fluidly connected to each other and to which at least one control valve unit (16) can be coupled in each case. The modular valve system (10) includes a process fluid section (90) comprising process fluid lines (78) through which a process fluid can flow, a control fluid section (32) comprising control fluid lines in at least some of the valve modules (12) through which a control fluid can flow, and a membrane (80) which is shared by at least some of the valve modules (12) and designed for controlling the process fluid in the process fluid section (90) while forming membrane valves (50) and for sealing off the control fluid section.

17 Claims, 9 Drawing Sheets

(56) References Cited

U.S. PATENT DOCUMENTS

| | | | | |
|---|---|---|---|---|
| 8,196,603 B2* | 6/2012 | Wilke | ................ | F16J 15/3236 |
| | | | | 137/597 |
| 8,590,567 B2 | 11/2013 | Wilke et al. | | |
| 8,807,164 B2* | 8/2014 | Baier | ................ | G01N 30/20 |
| | | | | 137/597 |

* cited by examiner

MODULAR VALVE SYSTEM

FIELD OF THE INVENTION

The invention relates to a modular valve system to be mounted on a support, in particular a support in an electric control cabinet.

BACKGROUND

In a valve system, a control fluid is distributed to various control valve units which each control a flow of a specific process fluid. Typically, compressed air is used as the control fluid, whereas the process fluid may be a liquid or a gas.

The control valve units used in the prior art comprise an inlet for the process fluid, via which the process fluid can be delivered to the respective control valve unit. Further, each control valve unit comprises an outlet via which the process fluid can flow out of the corresponding control valve unit and be supplied to e.g. an analyzer where it is examined. In each control valve, a valve is usually arranged which controls the flow of the process fluid through the control valve unit. The control fluid which is distributed via the valve system to the individual control valve units is used for controlling the valves. The valve may be designed as a membrane valve, for example.

From DE 10 2013 104 688 A1 for instance, there is known a valve system comprising such control valve units in which a process fluid acts as a control fluid for the other process fluids.

Other valve systems known from prior art are distinguished in that the valve system itself is acted upon only with the control fluid and is configured for its distribution, whereas the process fluid flows only through the corresponding control valve units. i.e. the connected process valves. Such a valve system is known from WO 99/54632 A1, for instance.

A modular valve system comprises several separate valve modules which can be set in fluidic communication and each may have several control valve units. The modular design enables to expand the valve system by the addition of further modules of identical construction and hence to adapt it to the requirements of the user, in particular with regard to the available ports. The individual valve modules each have internal control fluid lines, so that the individual control valve units can be supplied with the control fluid. Two neighboring valve modules are usually connected to each other via control fluid lines which emerge at the neighboring sides of the valve modules at openings which are in alignment in the assembled state, to form a continuous control fluid connection.

In these modular valve systems, it has turned out to be disadvantageous that the control fluid lines and the process fluid lines have to be sealed at the interfaces between the individual valve modules, requiring higher mounting expenditures. Further, the known valve systems have turned out to be disadvantageous to the effect that they are not easy to service, as the ports have to be pulled off from the control valve units during their maintenance, in particular in case a valve module is to be replaced.

It is the object of the invention to provide a valve system which is of simple construction and maintenance-friendly.

SUMMARY

The present invention provides a modular valve system to be mounted on a support, in particular a support in an electric control cabinet, comprising at least two individual valve modules which can be fluidly connected to each other and to which at least one control valve unit can be coupled in each case, the modular valve system including a process fluid section comprising process fluid lines through which a process fluid can flow, a control fluid section comprising fluid lines in at least some of the valve modules, through which a control fluid can flow, and a membrane which is shared by at least some of the valve modules and is designed for controlling the process fluid in the process fluid section while forming membrane valves and for sealing off the control fluid section.

The basic idea of the invention is that a common membrane is associated both to the process fluid section and the control fluid section as a whole. With the common membrane, a valve system is created which exhibits a media separation within a system, i.e. a separation of the process fluid from the control fluid, with both the process fluid and the control fluid flowing through the valve system. Further, the common membrane forms the individual membrane valves which are correspondingly driven by the control valve units in order to control the flow of the process fluid.

One aspect of the invention makes provision that the control fluid lines comprise control chambers and activation lines opening into these, via which the control fluid can flow into the respective control chamber, for activating the respectively associated membrane valve and for moving an associated membrane portion. The control chambers allow the membrane portion to be acted upon by the control fluid over a large surface area. The membrane portion, corresponding to a valve element of the membrane valve, is acted upon with pressure via the control fluid and is pressed against a valve seat. The membrane portion seals the respective control chamber, so that the control fluid can not escape from the control fluid section via the control chamber.

According to a further aspect of the invention, a central supply channel being a part of the control fluid section is provided for the control fluid, with all supply lines of at least one valve module, in particular of all of the valve modules, originating from said central supply channel. Via the central supply channel, all control chambers of a valve module are supplied with the control fluid, in particular the control chambers of all valve modules. This ensures a central supply of the control valve units and hence of the membrane valves, enabling a particularly simple and compact design of the modular valve system.

In particular, each control chamber has at least one discharge line associated to it, which is a part of the control fluid lines and originates in particular from an interface of the associated control valve unit. The control fluid provided in the control chamber can flow out of it and via the control valve unit into the discharge line. To this end, the control valve unit establishes a fluid connection between the discharge line and the activation line, the latter both opening at the interface. The control fluid can escape from the valve system through the discharge line. In this way, the pressurized control fluid introduced in the control chambers can escape via the discharge lines, so that the membrane portion and the membrane valve can change from a pressure-loaded position to a pressure-relieved position.

According to a further aspect of the invention, provision can be made that the discharge lines extend to or open into a common collecting channel, in particular a central sound absorber being provided on or in the collecting channel. The control fluid emanating from the respective control chambers of a valve module is collected in the common collecting channel. Again, this achieves a particularly compact design of the modular valve system. The optional sound absorber ensures that a discharge of the control fluids occurs with low noise. In addition, the sound absorber serves as a protective element preventing the ingress of foreign matter into the control fluid section, in particular into the collecting channel.

Further, at least some of the control chambers can be closed by the common membrane. The common membrane sealing off the control fluid section extends at least over some of the control chambers, so that a sealed control fluid section is formed. Accordingly, the control chambers form a flow-side end of the control fluid section, which end is sealed by the common membrane. The membrane portions of the membrane which seal the respective control chamber form the membrane valves. Thus, a single membrane simultaneously forms several membrane valves.

According to a further aspect of the invention, the membrane is arranged between at least one process fluid line and at least one control fluid line. The membrane is acted upon with the control fluid via the activation line which is part of the control fluid lines, to drive those membrane valves associated to the corresponding membrane portions. Here, the membrane valves cooperate at the same time with at least one process fluid line, so that a flow of the process fluid is either allowed or prevented by means of a shifted membrane valve. The corresponding membrane portion represents the valve element here, via which the flow of the process fluid is allowed or interrupted as a function of the activation via the activation line.

Further, each valve module may be a part of at least one membrane valve which comprises a valve seat for each control valve unit, with the option that preferably each valve seat of the valve system can be sealed by the membrane. Via the valve module, in particular by means of activation lines formed therein, the membrane portions forming the valve elements of the membrane valves are driven in order to be shifted from a pressure-relieved to a pressure-loaded position. In a closed position of the membrane valve, the corresponding membrane portion rests against the valve seat and seals it.

A further aspect of the invention makes provision that the control fluid section is of modular design, so that each valve module comprises a control fluid section part, the control fluid section parts of the respective valve modules being able to be set in fluidic communication with one another. This enables the modular design of the valve system, as the individual valve modules can be exchanged among each other. This is in particular due to the fact that each valve module comprises a process fluid section part and a control fluid section part which can be coupled to each other.

Further, the valve modules each may comprise a fluid line body in which at least the supply channels of the associated valve module are formed. Through this, the central control fluid supply of all control valve units of a valve module is provided by a single body. The control valve units coupled to the valve module can be supplied with the control fluid.

In particular, each fluid line body comprises a supply channel from which all supply channels of a valve module originate, the supply channels being formed in particular in groove-like fashion and being sealed by the common membrane. The control fluid is distributed to the individual supply channels via the supply channel, to supply the corresponding control valve units of the valve module, so that the membrane valves can be driven. Thus, a central supply and distribution of the control fluids as well as their sealing is ensured by the membrane.

Further, the supply channels of the valve modules each comprise coupling portions via which the supply channels of neighboring valve modules can be fluidly connected. This makes it possible to connect the respective control fluid section parts to one another, to form the common control fluid section of the valve system and the central supply channel via which all control valve units of the valve system can be supplied with the control fluid. Accordingly, a single control fluid port may be sufficient to supply the entire valve system with the control fluid.

A further aspect of the invention makes provision that each fluid line body comprises a contact area against which the common membrane rests, trough-shaped portions on the end face facing the membrane being closed by the membrane to form fluid-carrying lines or chambers, in particular the trough-shaped portions and/or chambers being limited and bordered by protruding webs whose end face is contacted by the membrane. The membrane thus seals the control fluid section part of the corresponding valve module, so that it can be ensured that no control fluid can escape via the fluid-carrying lines or chambers. The protruding webs ensure that a required pressure force of the membrane on the webs occurs if the valve system is assembled.

In this way, the fluid line body can be produced in a very simple manner, because its channels can be milled and drilled in one setting or because it can be simply molded.

Further, an especially plate-shaped connection element may be provided which has process fluid ports for the process fluid and/or at least one control fluid port for the control fluid formed thereon and on which the membrane rests at least in part, in particular substantially in area fashion. Via the connection element, the valve system can be supplied with the process fluid and/or the control fluid. The connection element may further be designed such that all the ports are formed on it. This results in that the entire valve system comprises only one side with ports. The membrane can directly cooperate with the lines starting from the ports.

According to one embodiment, provision is made that the central supply channel is formed in the connection element, in particular in that the central supply channel is formed in trough-like fashion and is closed by the membrane. The central supply channel provided for the distribution of the control fluid to the individual control valve units is accordingly arranged in that part of the valve system where the ports for the control fluid and the process fluid are provided. Thus, also the connection element comprises a control fluid section part.

The valve seats which are closed by the membrane in its closed position, are provided in particular on the connection element. The membrane valves, which are formed in part through the valve modules, are also partially formed by the connection element. The valve seats cooperate with a portion of the membrane, which represents the valve element. Hence, all membrane valves are defined by the membrane, the connection plate and the respectively provided valve modules.

Further, a process fluid channel may be provided in the connection element, which process fluid channel can be fluidically coupled to the associated process fluid line via at least one membrane valve. The process fluid may flow via the membrane valve from a process fluid line into the process fluid channel. The process fluid channel may have an output to which an analyzer can be connected, in order to analyze the process fluid which has been switched to fluidic communication via the respective membrane valve. The process fluid channel is formed in particular to be trough- or groove-shaped and is sealed via the membrane as well. Thus, the membrane seals the control fluid section and the process fluid section.

According to a further aspect of the invention, the connection element extends over all valve modules on the side of the common membrane which is opposite the valve modules. Consequently, the common membrane is arranged between the connection element and the respective fluid line bodies, so that the membrane adjoins both the control fluid lines and the process fluid lines and seals them up, insofar as they are formed to be trough- or groove-shaped. This also ensures that the membrane is part of all membrane valves which control the flow of all process fluids delivered to the valve system.

Further, junction lines may be provided in the connection element, which connect the supply channels of the individual valve modules to one another while forming the central supply channel. In this arrangement, the junction lines cooperate in particular with the coupling areas of the respective valve modules, so that a fluidic coupling among the supply channels is made. Thus, the central connection element serves for fluidically coupling the individual valve modules and represents, by means of the junction lines, a further part of the control fluid section. Fluid ports on the side faces of the valve modules are not necessary.

In particular, the membrane comprises recesses in the area of the junction lines, so that a fluidic communication through the membrane from a valve module into the connection element and from the connection element through the membrane into a neighboring valve module is formed. Thus, the membrane seals the junction of the control fluid lines from the valve module into the connection element and vice versa.

In a further aspect of the invention, provision is made that the membrane comprises recesses in the area of the junction lines, so that all the supply lines of the valve modules associated to the central supply channel lead off from the central supply channel. This makes it possible that the supply lines provided in the fluid line body can directly open into the central supply channel which is formed in the connection element.

It is also possible that the membrane comprises recesses in the area of the discharge lines, so that all discharge ones open into a central collecting channel. The central collecting channel is formed in the connection element as well, in particular so as to be groove-shaped or trough-shaped.

According to a further aspect of the invention, provision is made that neighboring valve modules rest against each other at side faces which are not provided with a fluid port. Due to providing the individual valve modules with the supply channels as well as due to forming the coupling areas and the central supply channel in the connection element, it is possible to mutually couple the valve modules without any fluid port on the side faces. This allows for a particularly easy replacement of individual valve modules.

DETAILED DESCRIPTION OF THE DRAWINGS

Figure 1:
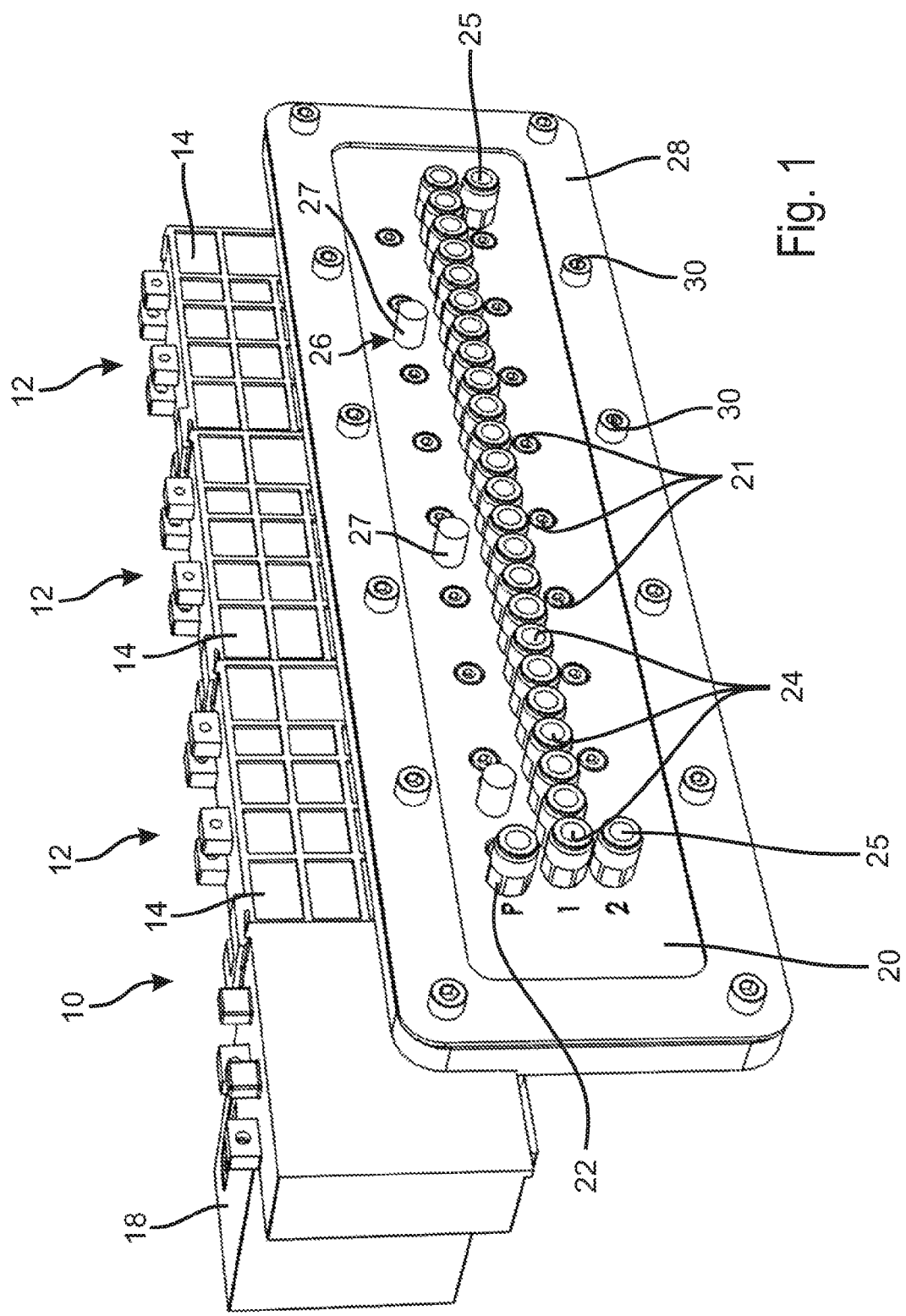
FIG. 1 is a perspective view of the front side of the modular valve system according to the invention.
Figure 2:
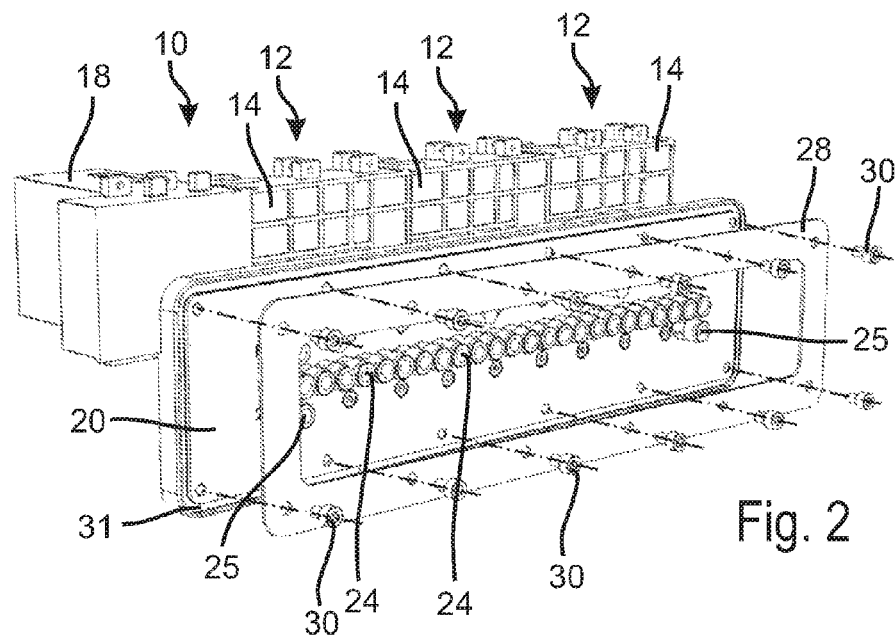
FIG. 2 is a partial exploded view of the valve system according to FIG. 1.
Figure 3:
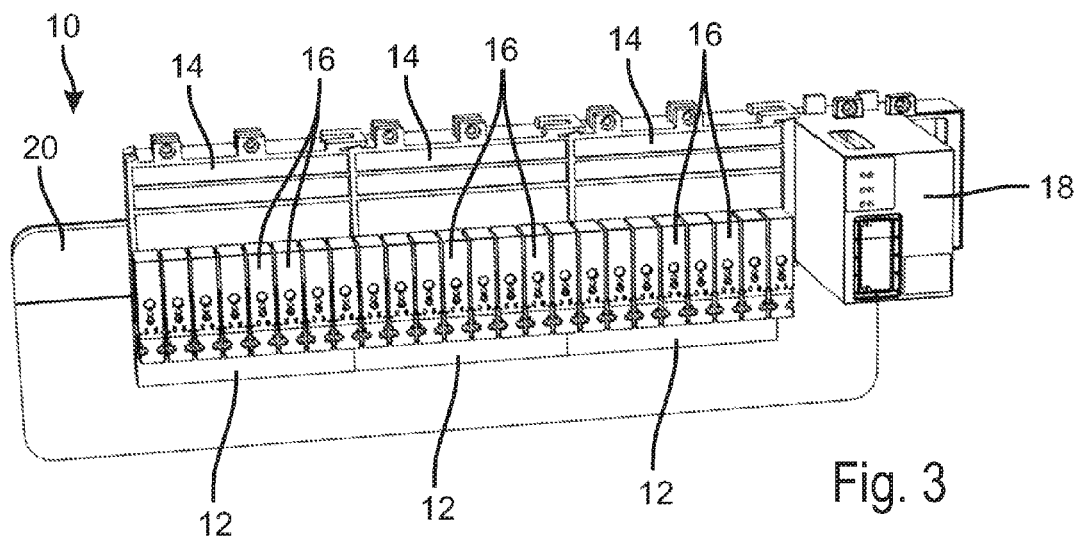
FIG. 3 is a perspective view of the rear side of the valve system of FIG. 1 with control valve units coupled thereto.

FIGS. 1 to 3 show a valve system 10 which is of modular design and comprises three valve modules 12 in the embodiment shown. The respective valve modules 12 can be set in fluidic communication with one another, as will be explained below, but they represent separately produced units.

An electronic unit 14 for several control valve units 16 is provided on each of the valve modules 12. The control valve units 16 are likewise coupled to a corresponding valve module 12 (see FIG. 3). In the illustrated embodiment, eight control valve units 16 are provided for each valve module 12, with the control valve units 16 arranged side by side extending over the entire width of the valve module 12. Notably, the control valve units 16 can be realized in particular as solenoid valve units.

The valve system 10 further comprises a central controller, also referred to as an electronic communication system 18, which drives the respective valve modules 12 via the electronic units 14 and represents the superordinate control unit of the valve system 10.

It can be further taken from FIGS. 1 to 3 that the valve system 10 comprises a connection element 20 which has an essentially plate-shaped design. The connection element 20 is connected to the valve modules 12 and the connection element 20 is arranged on the side of the valve modules 12 which is opposite the control valve units 16.

The connection element 20 is firmly connected to the valve modules 12 via fastening means 21 (see FIG. 1). The fastening means 21 may be embodied by screws.

FIGS. 1 and 2 show that the connection element 20 comprises several ports, these being a control fluid port 22 as well as several process fluid ports 24 (only two of them are provided with a reference symbol). Via the control fluid port 22, the valve system 10 is supplied with a control fluid, for instance compressed air, which serves for controlling any valves provided in the valve system 10, as will be explained below. These valves control the process fluids which are supplied to the valve system 10 via the respective process fluid ports 24.

It is possible to supply the valve system 10 with several process fluids via the several process fluid ports 24 arranged in a row of ports; the respective flow of said process fluids through the valve system 10 is correspondingly controlled via the associated control valve units 16. This will be explained below on the basis of the FIGS. 8 and 9 as well.

In addition, the connection element 20 comprises two process fluid outlets 25 from which the process fluids, which have been delivered to the valve system 10 via the process fluid ports 24, can be discharged again. By way of example, an analyzer in which a corresponding process fluid is analyzed can be connected to the process fluid outlets 25. Alternatively, the valve system 10 can be rinsed via the process fluid outlets 25.

The valve system 10 further comprises three outflow openings 26 from which the control fluid can be discharged in a controlled manner, as explained below. In the illustrated embodiment, each valve module 12 comprises an outflow opening 26 in which a sound absorber 27 is arranged in each case, damping the outflow noise of the control fluid. Moreover, the sound absorber 27 serves as a sealing element in order to prevent the ingress of foreign matter into the valve system 10. However, the sound absorbers 27 basically represent optional elements.

In particular, the fluid ports 22 to 26 as well as the sound absorbers 27 may be screwed into the connection element 20.

The valve system 10 also comprises an installation frame 28 which serves for fastening the valve system 10 to a support (not shown here), for instance to a support in an electric control cabinet. To this end, the support is arranged between the installation frame 26 and the connection element 20, so that the valve system 10 can be reliably fastened to the support via fastening elements 30. After installation in an electric control cabinet, not the entire valve system 10 can be seen, but only the front side of the connection elements 20. This is why the connection element 20 can be made of a material which has a high-quality appearance and is robust, for instance stainless steel.

Further, the connection element 20 has its front side provided with a peripherally surrounding groove 31 (FIG. 2) for a sealing element which is not shown here and rests against the corresponding support upon installation.

Figure 4:
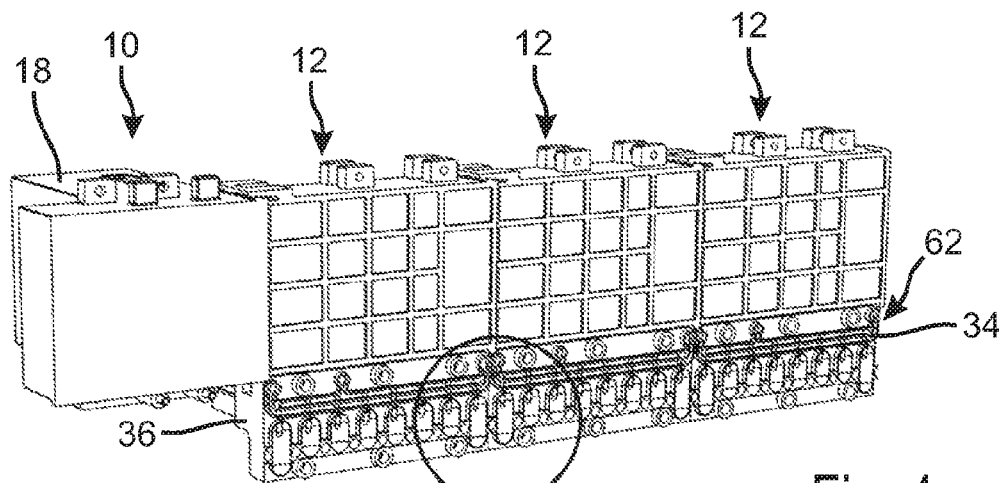
FIG. 4 is a perspective view of the front side of the valve system according to the invention without a connection element.

FIG. 4 shows the valve system 10 of FIGS. 1 to 3 without the connection element 20. This allows a view to the lines and channels of the valve system 10 for the control fluid which are situated behind the connection element 20. It is apparent from FIG. 4 that all valve modules 12 are identical in construction, so that the valve modules 12 are interchangeable and other valve modules 12 can be easily installed in short time.

The valve system 10 comprises a control fluid section 32 which includes various control fluid lines 34 serving for transporting the control fluids. The individual control fluid lines 34 and their functions will be explained in detail on the basis of FIGS. 5 to 7. As a basic principle, all the control fluid lines 34 are directly or indirectly supplied with the control fluid via the single control fluid port 22.

Figure 5:
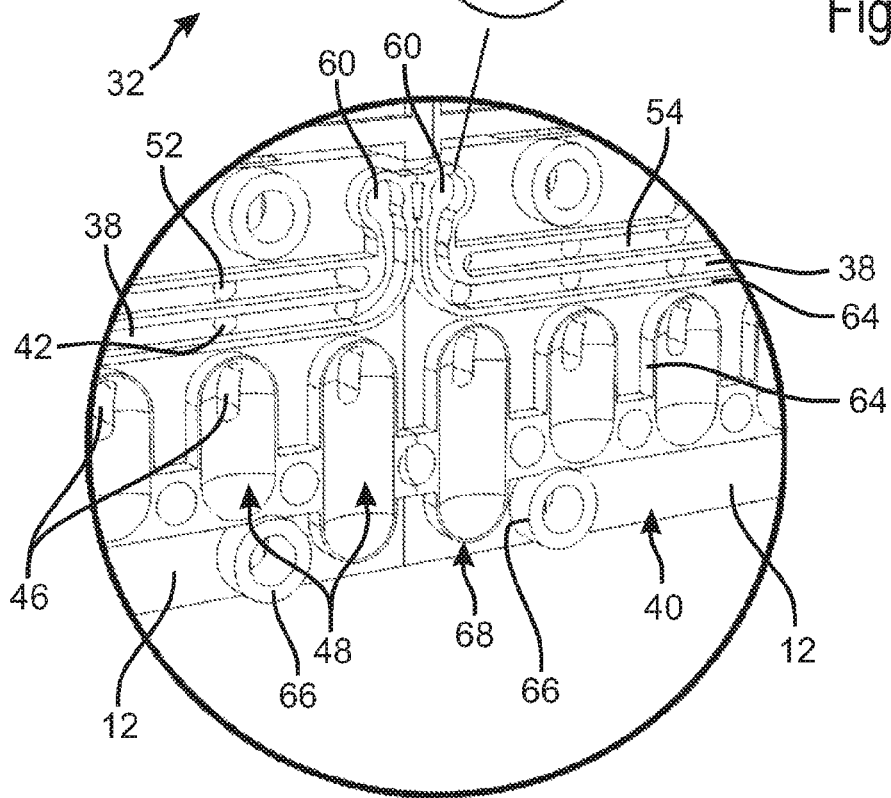
FIG. 5 shows an enlargement of a detail of FIG. 4.
Figure 6:
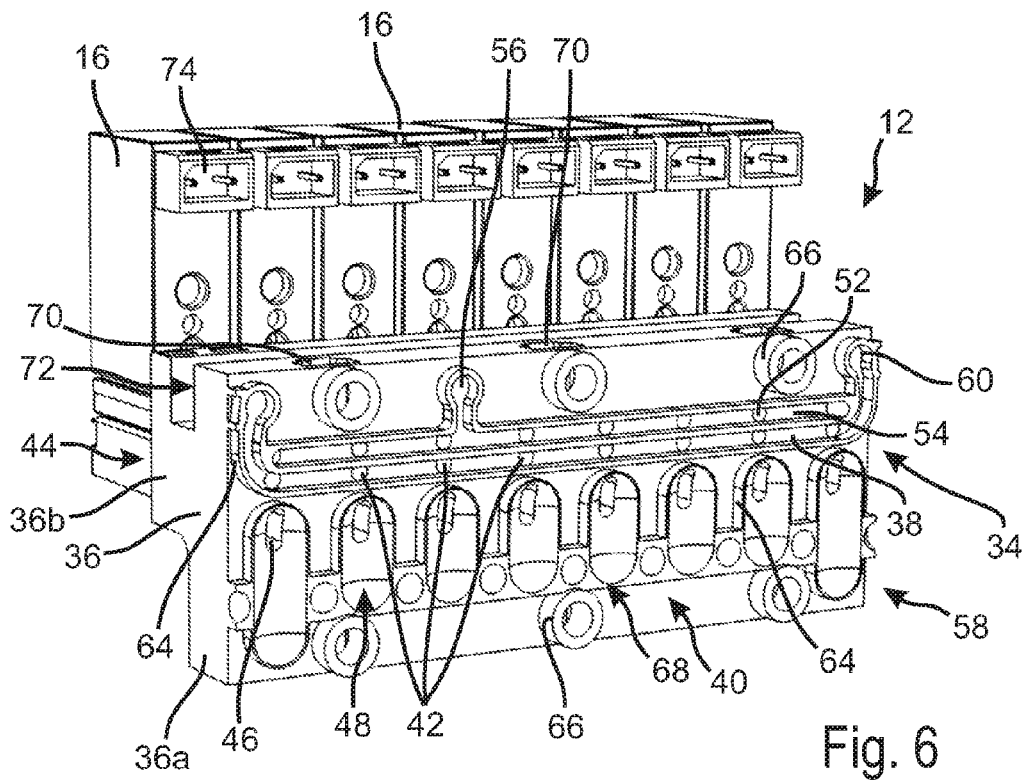
FIG. 6 is a perspective view of the front side of a valve module with control valve units coupled thereto.
Figure 7:
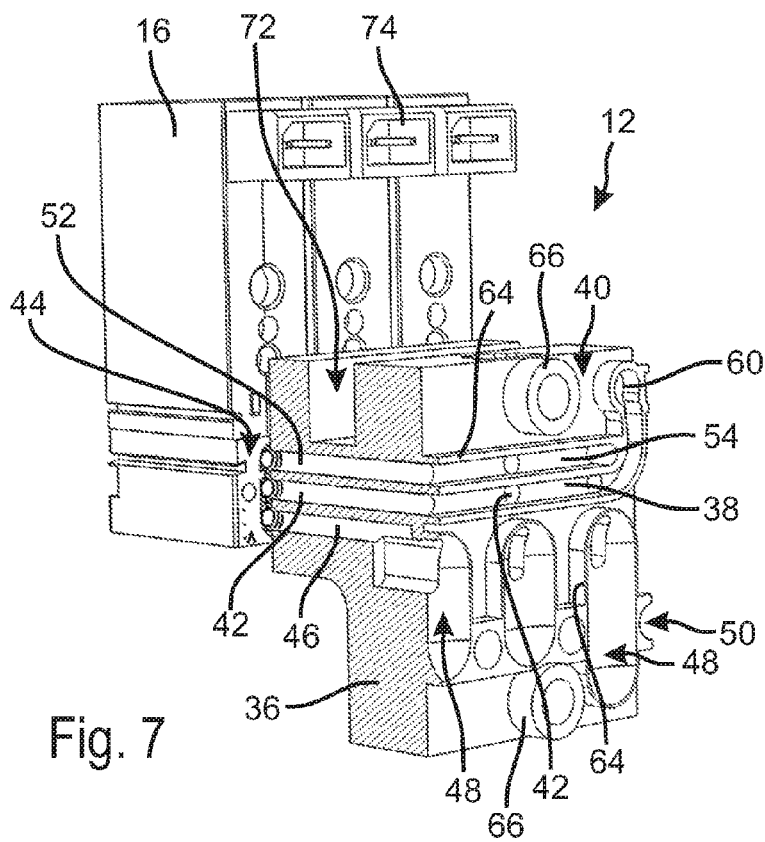
FIG. 7 is a perspective sectional view of the valve module with the coupled control valve units of FIG. 6.

FIG. 5 shows the connection area of two neighboring valve modules 12 of FIG. 4 in an enlarged view, whereas FIG. 6 illustrates a single valve module 12 with control valve units 16 arranged thereon. FIG. 7 shows the valve module 12 shown in FIG. 6 in a cross-sectional illustration.

The valve modules 12 of the illustrated embodiment each have a fluid line body 36 of their own, and all control fluid lines 34 are formed on and in said fluid line body (FIG. 6). Each fluid line body 36 is formed in one piece and comprises two plate-shaped portions 36a, 36b having differing heights. Further, the fluid line body 36 may be made of an injection-molded plastic part.

Each valve module 12 comprises a supply channel 38 which is formed as a groove-like channel on a frontal end face 40 of the corresponding valve module 12. The supply channel 38 substantially extends over the entire width of the valve module 12 or of the fluid line body 36, in particular between 80% and 100% of the width.

The supply channel 38 of the valve module 12 arranged on the left-hand side in the FIGS. 1, 2 and 4 is fluidly connected to the control fluid port 22 arranged on the connection element 20, so that the control fluid which is delivered at this point to the valve system 10 arrives at the supply channel 38. Starting from the supply channel 38, the control fluid is supplied via supply lines 42 to the individual control valve units 16 of the valve module 12 (FIG. 7). Each control valve unit 16 of a valve module 12 has a supply line 42 associated to it.

Each supply line 42 extends through the fluid line body 36 from the end face 40 (and the supply channel 38 which is arranged at this place) to an interface 44 to which the associated control valve unit 16 is coupled (FIG. 7). Via the respective interface 44, the control valve units 16 are supplied with the pressurized control fluid.

Furthermore, each interface 44 is formed in such a manner that one of the control valve units 16 can be coupled to the fluid line body 36. This means that the interfaces 44 at the same time have accommodation areas for the control valve units 16.

Moreover, each of the interfaces 44 is a starting point for an activation line 46 which also extends through the fluid line body 36 of the valve module 12 (FIG. 7). The activation lines 46 extend from the interface 44 to the end face 40, but in front of it they each open into a control chamber 48 which is of oval shape as seen in top view.

Each control chamber 48 cooperates with a membrane (not illustrated here) to form a membrane valve 50 which is driven by the control fluid. The function will be explained below on the basis of FIGS. 8 and 9.

Furthermore, each interface 44 is a starting point of a discharge line 52 which likewise extends through the fluid line body 36 to the end face 40. The discharge lines 52 all open at the end face 40 into a common nut- or trough-like collecting channel 54. The collecting channel 54 substantially extends parallel to the supply channel 38, with the collecting channel 54 being arranged on the end face 40 above the supply channel 38 (FIG. 6).

Each collecting channel 54 of a valve module 12 comprises a decoupling area 56 (FIG. 6) which is coupled to the outflow openings 26 in the connection element 20 which are shown in FIGS. 1 and 2.

In general, each control valve unit 16 coupled to a valve module 12 is provided with a supply line 42, an activation line 46, a control chamber 48, a membrane valve 50 and a discharge line 52.

In the illustrated embodiment, which is not to be understood in a limiting sense, each valve module 12 comprises a supply channel 38, eight supply lines 42, eight activation ones 46, eight control chambers 43, eight discharge lines 52 as well as one collecting channel 54 which in combination form a control fluid section part 58. The entirety of the control fluid section parts 58 of all valve modules 12 forms the control fluid section 32 of the entire valve system 10, provided that they are coupled to one another.

The coupling of the individual valve modules 12 is performed via coupling portions 60 which are shown in particular in FIG. 5.

Formed on the ends of each supply channel 38 are coupling portions 60 which can each be coupled to a coupling portion 60 of the neighboring valve module 12 in order to obtain a continuous control fluid supply of all valve modules 12. To this end, junction lines (not illustrated here) are provided, which will be explained below with the aid of FIGS. 10 and 11.

The entirety of the coupled supply channels 38 forms a central supply channel 62 (FIG. 4), via which all the control valve units 16 provided in the valve system 10 can be supplied with control fluid. This enables a distribution of the control fluid for the entire valve system 10 via only a single control fluid port 22.

Further, it is apparent from FIGS. 4 to 7 that the nut or trough-like supply channels 38 and collection channels 54 as well as the control chambers 48 are limited and bordered by protruding webs 64. By way of example, one of these webs 64 separates the collecting channel 54 from the supply channel 38. The webs 64 protrude from the end face 40 to form a front-end contact area 68 for the membrane (not shown here).

Figure 10:
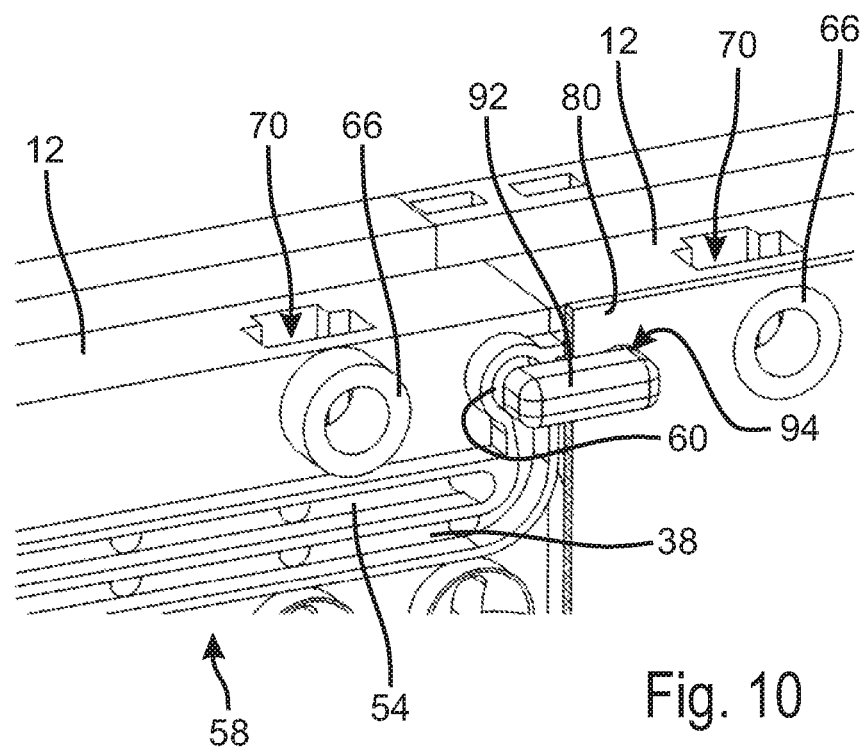
FIG. 10 is a detailed representation of the valve system according to FIG. 1.

In addition, spacing elements 66 are provided on the end face 40 of each of the valve modules 12. The spacing elements 66 likewise protrude from the end face 40 while projecting through the membrane 40 (FIG. 10).

The spacing elements 66 are further arranged at pockets 70 which are formed inside the fluid line body 36. Nuts for the fastening means 21 realized as bolts can be inserted in the pockets 70 to ensure the attachment of the valve modules 12 on the connection element 20. The spacing elements 66 have an annular design, so that the fastening means 21 can extend through them into the pockets 70.

Moreover, it is shown in particular in FIGS. 6 and 7 that each valve module 12 comprises a receiving groove 72 for receiving the electronic units 14 which drive the control valve units 16 via communication interfaces 74 shown in FIGS. 6 and 7.

The functions of the respective control fluid lines 34 as well as of the entire valve system 10 will now be explained with the aid of FIGS. 8 to 12.

Figure 8:
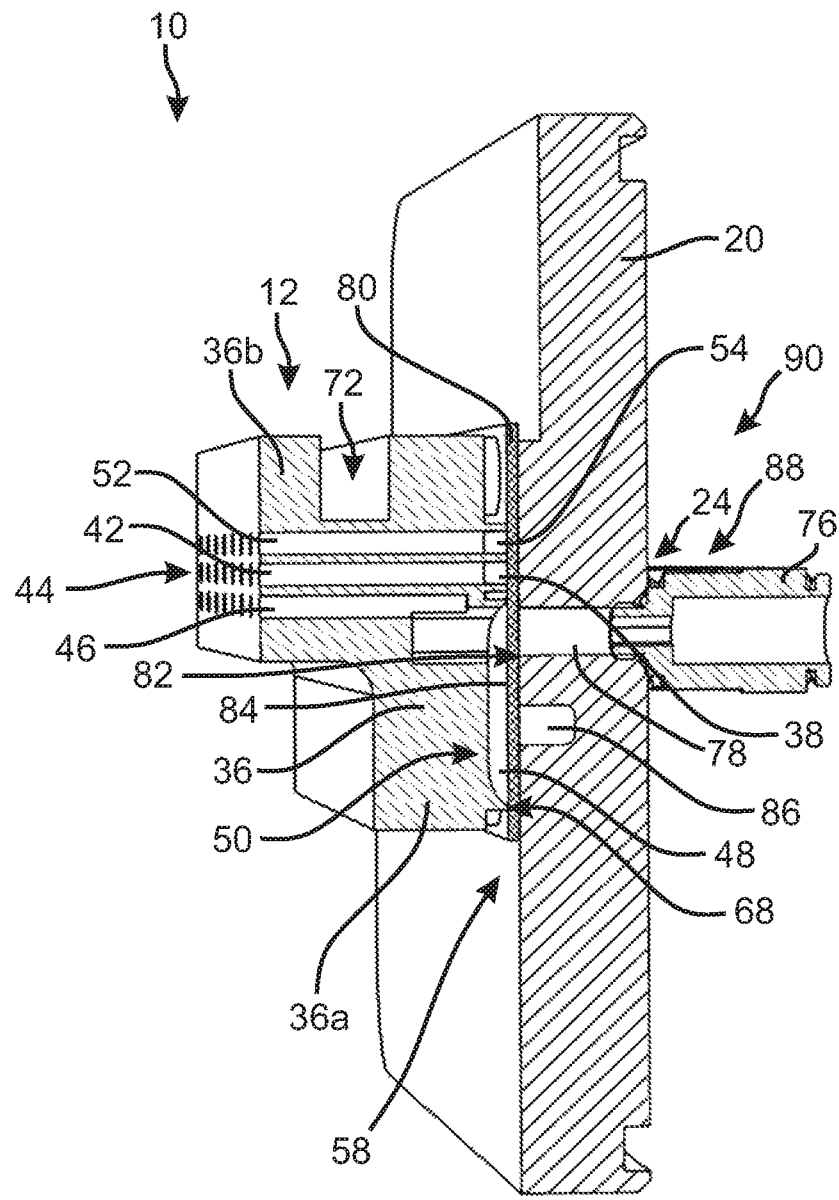
FIG. 8 is a perspective sectional view of the valve system according to a first embodiment comprising a connected process fluid supply line in a closed position of the membrane valve.
Figure 9:
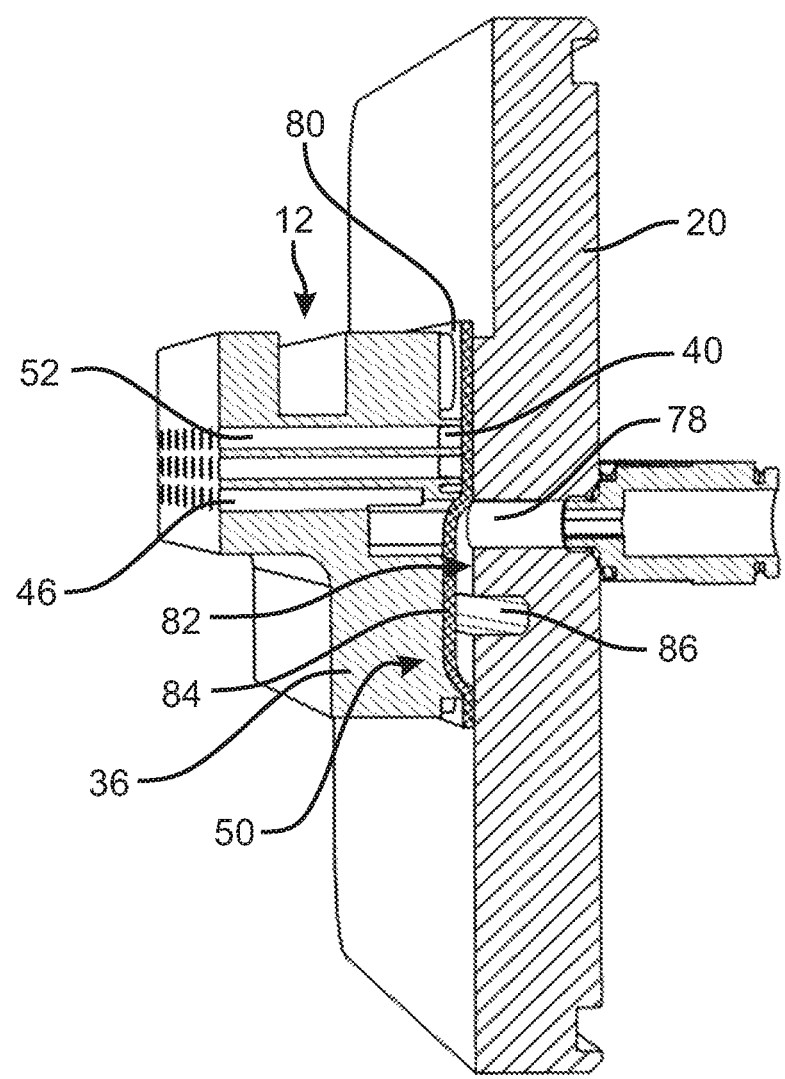
FIG. 9 shows the illustration of FIG. 8 in an open position of the membrane valve.

FIGS. 8 and 9 show the valve system 10 according to a first embodiment in a perspective cross-sectional view, comprising a connected process fluid supply line 76 via which the valve system 10 is supplied with a process fluid.

The process fluid supply line 76 is plugged in one of the process fluid ports 24 and delivers the process fluid to a process fluid line 78 arranged in the connection element 20.

The process fluid line 78 is limited by the illustrated membrane 80 which is arranged between the connection element 20 and the valve module 12 or the fluid line body 36.

Figure 12:
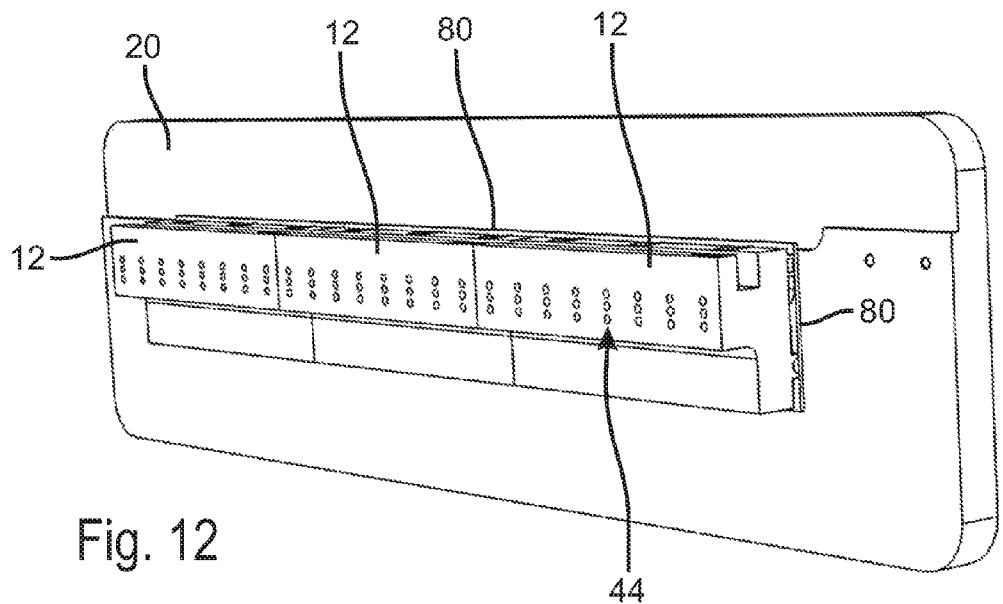
FIG. 12 is a perspective view of the rear side of the valve system according to FIG. 1, FIG. 13 a fictitious perspective view of the rear side of the valve system according to FIG. 1, in which the valve module is illustrated in part.

As apparent from FIG. 12 which shows the rear side of the valve system 10, the membrane 80 formed in one piece extends over all valve modules 12.

In the illustrated embodiment, the membrane 80 seals the control chamber 48, the nut or trough-like collecting channel 54 as well as the nut or trough-like supply channel 38. Thus, the membrane 80 seals the control fluid section part 58 of the illustrated valve module 12. As the membrane 80 extends over all valve modules 12, the membrane 80 basically seals the control fluid section parts 58 of all valve modules 12 and hence the control fluid section 32 of the entire valve system 10.

Moreover, the membrane 80 has several portions resting against all control chambers 48 of a valve module 12 and forms a membrane valve 50 with each control chamber 48; this membrane valve controls the process fluid delivered to the valve system 10. To this end, the connection element 20 comprises a valve seat 82 of the membrane valve 50; in a closed position as is shown in FIG. 8, a membrane portion 84 acting as a valve element rests against said valve seat. In the closed position, the process fluid—which is delivered to the valve system 10 via the illustrated process fluid supply line 76—can not flow into a neighboring process fluid channel 86 arranged in the connection element 20. The process fluid channel 86 also has the shape of a trough or groove and is sealed by the membrane 80 as well.

In order to hold the membrane valve 50 in its illustrated closed position, the control valve unit 16 (not illustrated here) controls the interface 44 in such a manner that there is a fluidic communication between the supply line 42 and the activation line 46. In this process, the pressurized control fluid can flow into the corresponding control chamber 48 via the supply channel 38, the supply line 42 branching off from it, the interface 44 as well as the activation line 46 and press against the membrane portion 84. The membrane portion 84 associated to the process fluid line 78 and the process fluid channel 86 is pressed against the valve seat 82 formed on the connection element 20 and bordering the mouth of the process fluid line, so that the membrane valve 50 is closed and blocks any flow of the process fluid (FIG. 8).

In FIG. 9, the membrane valve 50 is in its open position in which there is a fluid connection between the process fluid line 78 and the process fluid channel 86.

In order to switch from the closed position shown in FIG. 8 to the open position shown in FIG. 9, the control valve unit 16 associated to the control chamber 48 controls the control fluid in such a manner that the previously existing overpressure in the control chamber 48 does not exist any more. To this end, the control valve unit 16 establishes a fluidic communication between the activation line 46 (containing the pressurized control fluid) and the discharge line 52. At the same time, the process fluid presses against the membrane portion 84, so that the membrane portion 84 is able to displace the control fluid out of the control chamber 48.

Through this, the membrane portion 84 is urged to the position shown in FIG. 9, in which the membrane portion 84 rests against the wall portion of the control chamber 48 in the fluid line body 36.

The control fluid displaced out of the control chamber 48 flows into the collecting channel 54 via the interface 44 of the control valve unit 16 and via the discharge line 52. From the collecting channel 54, the displaced control fluid flows to the decoupling area 56 and to the outflow opening 26 arranged in the connection element 20. The control fluid can escape with reduced noise via the outflow opening 26 and the sound absorber 27 arranged therein.

The process fluid delivered to the valve system 10 via the process fluid supply line 76 flows through the opened membrane valve 50 into the process fluid channel 86 and arrives at the two process fluid outlets 25 where an analyzer may be arranged. The supplied process fluid can be analyzed here.

The electronic communication system 18 controls the electronic unit 14 of the corresponding valve module 12, so that the control valve unit 16 associated to illustrated process fluid line 76 moves the membrane valve 50 by pressurization to the closed position again, as has been explained with the aid of FIG. 8. Subsequently, the electronic communication system 18 can drive the neighboring control valve unit 16 in order to open the membrane valve 50 associated to the neighboring control valve unit 16. This makes it possible that a process fluid—which is associated to the process fluid port 24 of the neighboring control valve unit 16—can flow into the process fluid channel 86 via the opened membrane valve 50.

In general, the membrane 80 comprises several membrane portions 84 which form a membrane valve 50 together with a control chamber 48. Each membrane valve 50 is associated to a control valve unit 16 and is correspondingly driven by it to control the flow for a specific process fluid which is delivered to the valve system 10 via one of the process fluid ports 24.

All process fluid lines 78 leading off the process fluid ports 24 and the part of the process fluid channel 86 associated to a valve module 12 form a process fluid section part 88. All process fluid lines 78 of all valve modules 12 as well as the entire process fluid channel 86 form the process fluid section 90 of the valve system 10, the former including the respective process fluid section parts 88 associated to the individual valve modules 12.

As the membrane 80 extends over all the valve modules 12, it seals the control fluid section 32 and the process fluid section 90 of the entire valve system 10 and at the same time forms all membrane valves 50.

FIGS. 8 and 9 also show that the membrane 80 rests against the contact area 68 of the valve module 12. The webs 64 and the spacing elements 66 are formed such that the contact area 68 defined by them forms a pressure surface for the membrane 80, via which the required pressure force for the membrane 80 is provided. Due to the pressure force, it is ensured that the membrane 80 reliably seals the various control fluid fines 34.

Further, the membrane 80 is indirectly centered via the spacing elements 66, as it has (not shown) recesses through which the fastening means 21 extend. Only with a correct arrangement of the membrane 80, the recesses overlap with the spacing elements 66, so that the fastening means 21 can extend through the connection element 20, the membrane 80 and the recesses provided there as well as through the spacing elements 66. The fastening means 21 will then cooperate with nuts in the pockets 70, so that they create a pressure force in the valve system 10 such that the membrane 80 is clamped between the connection element 20 and the valve modules 12 with the required pressure.

Figure 11:
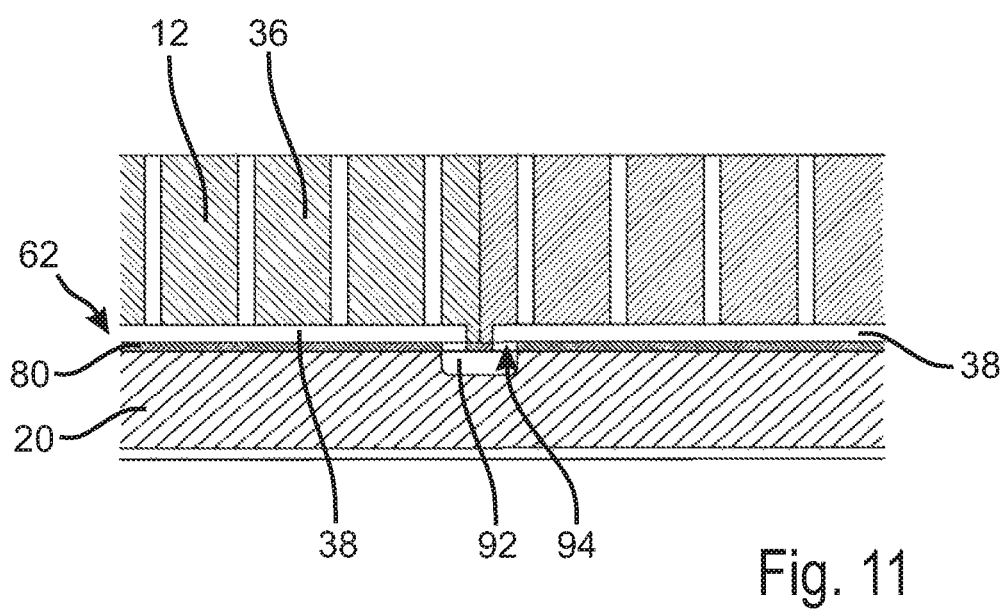
FIG. 11 is a sectional view in top view of the valve system which is shown in detail in FIG. 10.

FIGS. 10 and 11 fictitiously show how neighboring valve modules 12 are coupled to each other via the respective coupling portions 60. In the fictitious illustration, the membrane 80 is shown only in part. The coupling portions 60 are connected to each other via junction lines 92 which are formed in the connection element 20 and have a U-shape as seen in top view, in the illustration shown in FIG. 10, only the junction fines 92 of the connection element 20 can be seen which are shown fictitiously by the surface delimiting them, to illustrate the fluidic coupling. Thus, the connection element 20 is illustrated as reduced to the junction fines 92.

The individual supply channels 38 of the respective valve modules 12 are fluidically coupled to each other via the junction lines 92, to form the central supply channel 62 of the valve system 10.

Recesses 94 are provided in the membrane 80 (FIG. 11), so that the control fluid can flow over into a junction fine 92 in the connection element 20 via the supply channel 38 of a first valve module 12 through the membrane 80. From this junction fine 92, the control fluid can now flow again through the membrane 80 into the supply channel 38 of a neighboring valve module 12. Accordingly, the control fluid can flow partially through the valve modules 12 and the connection element 20. Hence, the control fluid section 32 of the valve system 10 is formed both by the valve modules 12 and by the connection element 20.

This way of coupling neighboring valve modules 12 allows to realize the side faces of the valve modules 12 without any fluid ports, so that they can have a full-surface contact with each other, simplifying their production. The continuous control fluid supply of all valve modules 12 or of the valve system 10 is provided by means of the connection element 20. Through this measure, a replacement of the valve modules 12 is significantly simplified, as sealing off the lateral fluid connections is not necessary if a valve module 12 is replaced. This means that the valve system 10 has a significantly improved maintainability.

FIGS. 12 to 15 show the valve system 10 according to the first embodiment from the rear side in various perspectives.

In FIG. 12, one can see the respective interfaces 44 to which the various control valve units 16 can be coupled.

Figure 13:
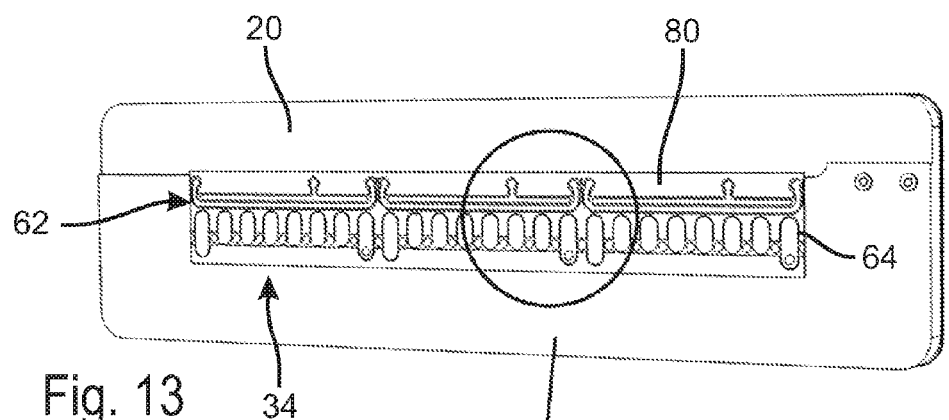
Figure 14:
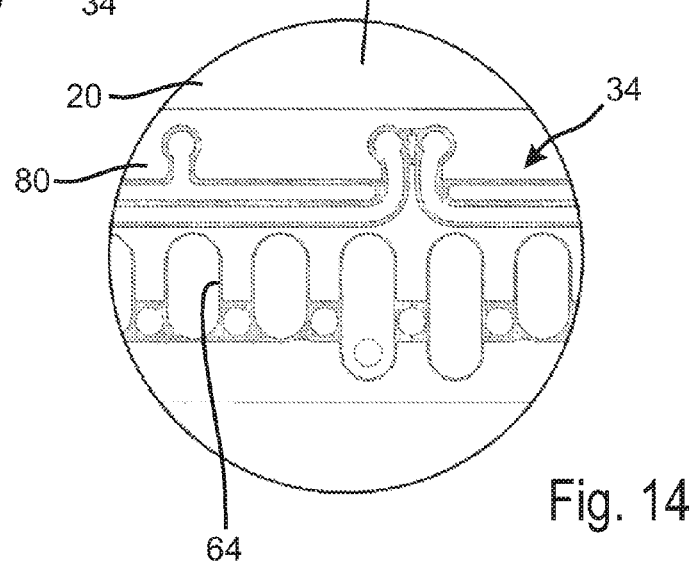
FIG. 14 is a detail view of FIG. 13.

FIGS. 13 and 14 show fictitious illustrations of the valve system 10, as not the entire valve modules 12 are shown, but only the control fluid lines 34 arranged on the end face 40 and the webs 64 thereof, whereas the fluid line body 36 is not illustrated. These two Figures merely serve for visualizing the way how the control fluid lines 34 cooperate with the connection element 20 and the membrane 80.

Again, it can be seen in particular in FIG. 13 that the membrane 80 cooperates all valve modules 12 and forms all the membrane valves 50 of the valve system 10.

Figure 15:
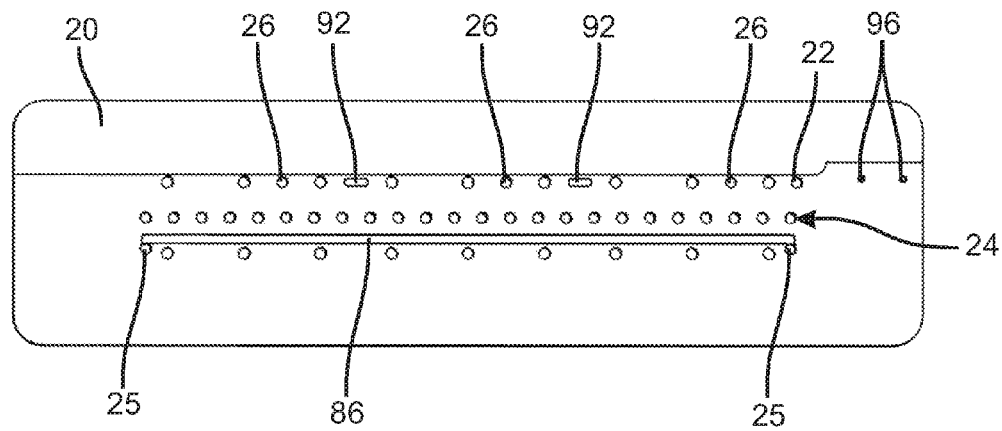
FIG. 15 is a rear view of a connection element of the valve system of the invention according to FIG. 1.

FIG. 15 shows the connection element 20 from the rear side, in order to show the ports 22 to 26 (which are shown in FIGS. 1 and 2 from the front) as well as the openings for the fastening means 21 from the rear side.

On the whole, a single control fluid port 22, one outflow opening 26 for each valve module 12 and three openings for the fastening means 21 as well as one process fluid port 24 for each connectable control valve unit 16 are provided.

Further, the two junction lines 92 are shown coupling the three valve modules 12 of the valve system 10 to one another in fluidic terms, to form the central supply channel 62 and ensure the continuous distribution of the control fluid.

It can also be taken from FIG. 15 that the process fluid channel 86 is continuously formed in the connection element 20 in trough- or groove-shaped fashion.

Further, two fastening openings 96 for the electronic communication system 18 are shown.

Figure 16:
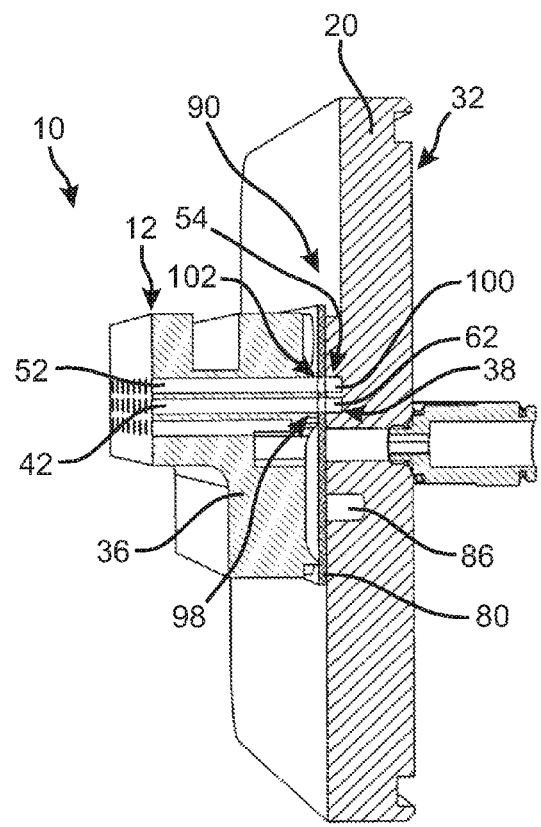
FIG. 16 is a perspective sectional view of the valve system of the invention according to a second embodiment comprising a connected process fluid supply line in a closed position of the membrane valve.

FIG. 16 shows a second embodiment of the valve system 10, which differs from the first embodiment illustrated in the preceding Figures only in this respect that the connection element 20 comprises all groove-like fluid lines. This means that the connection element 20—in addition to the process fluid channel 86—comprises the supply channels 38 as well as the collection channels 54 of the respective valve modules 12, resulting in a significant simplification of the production of the fluid line body 36.

In the second embodiment, the supply channels 38 of the individual valve modules 12 are formed to be continuous and so as to be connected to each other, so that the connection element 20 comprises the central supply channel 62 from where the individual supply fines 42 directly lead off to the corresponding control valve units 16.

In the second embodiment, the membrane 80 comprises further recesses 98, so that the supply lines 42 can be in fluidic communication with the central supply channel 62 provided in the connection element 20 through the further recesses 98 of the membrane 80. This allows to deliver the control fluid directly to the supply lines 42 via the central supply channel 62 formed in the connection element 20.

The collection channels 54 of the valve modules 12 are continuous as well and form a central collecting channel 100 in the connection element 20, with all the discharge lines 52 opening directly into it. To this end, the membrane 80 comprises additional recesses 102 enabling a fluidic communication between discharge lines 52 formed in the valve modules 12 and the connection element 20. The central collecting channel 100 is formed in the connection element 20 with a trough- or groove-like design, in particular above the central supply channel 62.

In this embodiment, the membrane 80 seals all trough-like channels and lines which are all formed in the connection element 20. The control fluid section 32 and the process fluid section 90 of the valve system 10 are sealed by the common membrane 80.

In the second embodiment, the end face 40 of the valve modules 12 can be designed to be correspondingly planar, as no protruding webs for forming the supply channels 48 and the collection channels 54 are provided.

In general, the valve system 10 according to the invention merely has a single control fluid port 22 via which all the control valve units 16 of the entire valve systems 10 can be supplied with the control fluid.

By way of example, such a valve system 10 can be used in water treatment plants such as a reverse osmosis or a sea water desalination plant for monitoring the water duality, with the treated water serving as a process fluid whose salt content is monitored in an analyzer, for example.

At the same time, the salt content allows to monitor the function of the osmosis membranes which are used for treating the water. Via the high number of process fluid ports 24, the valve system 10 is supplied with water which has been treated in varying degrees and can be delivered in each case through the valve system 10 to an analyzer. To this end, the individual membrane valves 50 are switched over successively in series, this process being performed via the corresponding activation of the electronic communication system 18 and the associated control valve units 16. Due to said scheme of switching the individual membrane valves 50, it is particularly easy to operate the entire valve system 10 (as well as the control valve units 16 connected thereto) via the single control fluid port 22 for the control fluid, as there are no differing or varying requirements of the control fluid.

This allows an automated operation of the monitoring of a water treatment plant, with a central extraction or measuring point being provided, as the valve system 10 allows to feed all the process fluids to an analyzer in succession and in automated fashion.

The simple design of the valve system 10 is distinguished in particular in that all the fluid ports 22, 24, 25, 26 are sealed by the membrane 80 and further arranged on the connection element 20. This allows to install the valve system 10 in an electric control cabinet in an easy way. In case of replacement of the membrane 80, all the fluid ports 22, 24, 25, 26 can remain connected to their supply lines, whereby the maintenance expenditure is significantly reduced.

The invention claimed is:

1. A modular valve system to be mounted on a support, comprising at least two individual valve modules which can be fluidly connected to each other and to which at least one control valve unit can be coupled in each case, the modular valve system having
    a process fluid section comprising process fluid lines through which a process fluid can flow;
    a control fluid section comprising at least one fluid control chamber and fluid control lines through which a control fluid can flow, and
    a common membrane shared by at least two valve modules and designed for controlling the process fluid in the process fluid section while forming membrane valves and for sealing off the control fluid section, and wherein the common membrane seals off the at least one fluid control chamber and fluid control lines,
    wherein the valve modules each comprise a fluid line body, with at least the control fluid lines of the associated valve module being formed in or on said fluid line body, wherein each fluid line body comprises a supply channel from which all supply lines of a valve module originate, and wherein the supply channels are formed as grooves and sealed by the common membrane.

2. The modular valve system according to claim 1, wherein the control fluid lines comprise control chambers and activation lines opening into these, via which the control fluid can flow into the respective control chamber, for activating the respectively associated membrane valve and for moving an associated membrane portion.

3. The modular valve system according to claim 2, wherein a central supply channel is provided for the control fluid and is a part of the control fluid section, with supply lines of at least one valve module, originating from said central supply channel.

4. The modular valve system according to claim 2, wherein the control chambers are closed by the common membrane.

5. The modular valve system according to claim 1, wherein a central supply channel is provided for the control fluid and is a part of the control fluid section, with supply lines of at least one valve module originating from said central supply channel, wherein the central supply channel supplies the control fluid to control chambers of individual valve modules and wherein the central supply channel is sealed off by the common membrane.

6. The modular valve system according to claim 5, wherein each control chamber has at least one discharge line associated with it, which is a part of the control fluid lines and originates from an interface of the associated control valve unit.

7. The modular valve system according to claim 6, wherein the discharge lines extend to or open into one of a common collecting channel and a central sound absorber being provided on or in the collecting channel.

8. The modular valve system according to claim 5, wherein coupling portions are formed at ends of each supply channel of the valve modules, wherein the coupling portions of one valve module can be coupled to the coupling portions of neighboring valve modules such that a continuous control fluid supply of all valve modules is obtained.

9. The modular valve system according to claim 1, wherein the membrane is arranged between at least one process fluid line and at least one control fluid line.

10. The modular valve system according to claim 1, wherein each valve module is a part of at least one membrane valve which comprises a valve seat for each control valve unit.

11. The modular valve system according to claim 1, wherein the control fluid section is of modular design, each of the valve modules comprise a control fluid section part, and the control fluid section parts of the respective valve modules are able to be set in fluidic communication with one another.

12. The modular valve system according to claim 1, wherein a central supply channel is provided for the control fluid and is a part of the control fluid section, with supply lines of at least one valve module, originating from said central supply channel, and wherein the supply channels of the valve modules each comprise coupling portions via which the supply channels of neighboring valve modules can be fluidly connected to form the central supply channel.

13. The modular valve system according to claim 1, wherein each fluid line body comprises a contact area on an end face against which the common membrane rests, wherein trough-shaped portions on the end face facing the membrane are closed by the membrane to form fluid-carrying lines or chambers, the trough-shaped portions and/or chambers being limited and bordered by protruding webs having an end face that is contacted by the membrane.

14. A modular valve system to be mounted on a support, comprising at least two individual valve modules which can be fluidly connected to each other and to which at least one control valve unit can be coupled in each case, the modular valve system having
- a process fluid section comprising process fluid lines through which a process fluid can flow;
- a control fluid section comprising at least one fluid control chamber and fluid control lines through which a control fluid can flow, and
- a common membrane shared by at least two valve modules and designed for controlling the process fluid in the process fluid section while forming membrane valves and for sealing off the control fluid section, and wherein the common membrane seals off the at least one fluid control chamber and fluid control lines,
- wherein a connection element is provided which has process fluid ports for the process fluid and/or at least one control fluid port for the control fluid formed thereon and on which the membrane rests at least in part,
- wherein a central supply channel is provided for the control fluid and is a part of the control fluid section, with supply lines of at least one valve module, originating from said central supply channel, and that the central supply channel is formed as a trough in the connection element and is closed by the common membrane.

15. The modular valve system according to claim 14, wherein valve seats are formed on the connection element and are sealed by the membrane in their closed position.

16. The modular valve system according to claim 14, wherein the connection element extends over all valve modules on the side of the common membrane which is opposite the valve modules.

17. The modular valve system according to claim 16, wherein a central supply channel is provided for the control fluid and is a part of the control fluid section, with supply lines of at least one valve module, originating from said central supply channel, wherein junction lines are provided in the connection element, which connect the supply channels of the individual valve modules to one another while forming the central supply channel.

* * * * *